(12) United States Patent
Sluder (10) Patent No.: US 6,935,095 B1
(45) Date of Patent: Aug. 30, 2005

(54) ROTARY LAWNMOWER BLADE WITH REVERSIBLE REPLACEABLE BLADES

(76) Inventor: Roy Gene Sluder, 1350 N. Hwy. 107, Greeneville, TN (US) 37743

( * ) Notice: Subject to any disclaimer, the term of this patent is extended or adjusted under 35 U.S.C. 154(b) by 150 days.

(21) Appl. No.: 10/900,782

(22) Filed: Jul. 28, 2004

(51) Int. Cl.$^7$ .............................................. A01D 34/64
(52) U.S. Cl. ....................... 56/295; 56/255; 56/17.5; 56/DIG. 17
(58) Field of Search ...................... 56/295, 255, 17.5, 56/DIG. 17

(56) References Cited

U.S. PATENT DOCUMENTS

| | | |
|---|---|---|
| 2,963,844 A | 12/1960 | Engier |
| 3,097,468 A | 7/1963 | Johnson |
| 3,103,093 A | 9/1963 | House, Jr. |
| 3,152,432 A | 10/1964 | Scarnato |
| 3,243,944 A | 4/1966 | Michavo |
| 3,320,733 A | 5/1967 | Kirk |
| 3,321,894 A | 5/1967 | Ingram |
| 3,327,460 A * | 6/1967 | Blackstone ................ 56/295 |
| 3,447,291 A | 6/1969 | Guetterman |
| 3,507,104 A * | 4/1970 | Kline et al. .................... 56/295 |
| 3,563,015 A | 2/1971 | Renfroe |
| 3,683,606 A | 8/1972 | Staines |
| 3,769,784 A | 11/1973 | Jones |
| 4,229,933 A * | 10/1980 | Bernard ...................... 56/295 |
| 4,375,148 A | 3/1983 | Beck |
| 4,611,459 A * | 9/1986 | Cartner ...................... 56/12.7 |
| 4,750,320 A | 6/1988 | Liebl |
| 5,018,347 A | 5/1991 | Feilen |
| 5,019,113 A * | 5/1991 | Burnell ...................... 56/295 |
| 5,036,654 A | 8/1991 | Malutich |
| 5,383,329 A | 1/1995 | Cornell, III |
| 5,438,819 A * | 8/1995 | Dallman ...................... 56/295 |
| 5,791,131 A * | 8/1998 | Hill et al. .................... 56/295 |
| 6,182,430 B1 * | 2/2001 | Blarek et al. ................. 56/295 |

\* cited by examiner

*Primary Examiner*—Meredith Petravick (57) ABSTRACT

Attachable to a rotary lawnmower shaft is a body assembly of a rectangular shape having a removable and reversible blade on each end. The blades are easily and quickly removed, reversed, and replaced without tools. The blades are locked in position by a unique and simple locking device. During operation of the mower, the centrifugal force of the rotating body assembly further locks the blades in place for additional safety. When the body assembly is in rotation, the blades are designed to create air turbulence which causes the cut grass clippings to exit the lawnmower.

2 Claims, 7 Drawing Sheets

ROTARY LAWNMOWER BLADE WITH REVERSIBLE REPLACEABLE BLADES

CROSS-REFERENCED TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to a rotary lawnmower blade and, more particularly, to a rotary lawnmower blade with removable reversible replaceable blades.

2. Background of the Invention

Rotary lawnmowers are by far the most common type of mower used by both the homeowner and the commercial operator. The blades on these mowers are in almost all cases a flat, rectangular steel bar, sharpened on the leading edges at each end of the bar to form a cutting edge. The frequency of use and the condition of the terrain mowed determines how often the blades dull and require sharpening. This task, which generally involves removing the blade from the mower, regrinding the cutting edges, balancing the blade and replacing it on the mower is a job the average homeowner doesn't want to do, resulting in taking the lawnmower to a professional shop for this service.

The most common approach taken to solve this problem is a blade assembly with detachable blades that can be removed, resharpened or replaced without removing the blade assembly from the lawnmower. Being of various designs, none of these seem to have been a commercial success and made available to the consumer, being of bad designs and too expensive to manufacture.

It is therefore an object of the present invention to provide a new and improved lawnmower blade assembly, consisting of a body assembly and two removable, reversible and reusable blades, that is economical to manufacture.

A further object of the present invention is the use of readily available materials to produce a durable blade assembly.

A further object of the present invention is to have the body assembly portion of the blade assembly to remain on the lawnmower while the blades are changed.

A further object of the present invention is in its design, allowing the changing of the blades without the use of tools.

A further object of the present invention is the ability to reverse the blades, resulting in exposing a new cutting edge.

A further object of the present invention is its design allows the changing of one blade or the changing of both blades.

A further object of the present invention allows the blades to be removed, resharpened and replaced.

A further object of the present invention allows the manufacturer to package the complete blade assembly or the blades individually, resulting in an advantage in cost and convenience for the consumer.

A further object of the present invention is the design allows for the manufacture of different size blade assemblies by increasing the length of the body (center section) of the blade assembly, resulting in tooling cost savings.

A further object of the present invention is the blade design being of a nature containing a grass turbulence surface area, creating an air disturbance of a centrifugal nature when the blade is in rotation as in mowing, resulting in the cut grass exiting the lawnmower.

A further object of the present invention is the fastening of the blade body to the lawnmower power shaft and it remaining in this position while the replaceable blades are changed.

A further object of the present invention is the unique design of the body assembly and blades and the procedure for removing and replacing the blades results in the blades locking to the body assembly.

A further object of the present invention is the blades being held on the body assembly by proper mechanical design and the centrifugal force created when the lawnmower is running, causing the blade assembly to rotate.

Further objects and advantages of my invention will become apparent from consideration of the drawings and ensuing description.

SUMMARY

The blade assembly for a rotary lawnmower described herein includes a body assembly being attached to the lawnmower power shaft. The body assembly contains two detachable cutting blades, each blade having two opposite cutting edges. Each blade is removable, reversible, and replaceable while the body assembly remains attached to the lawnmower power shaft. No tools are required for the removal and replacement of the blades.

DETAILED DESCRIPTION OF THE PREFERRED EMBODIMENT

Figure 1:
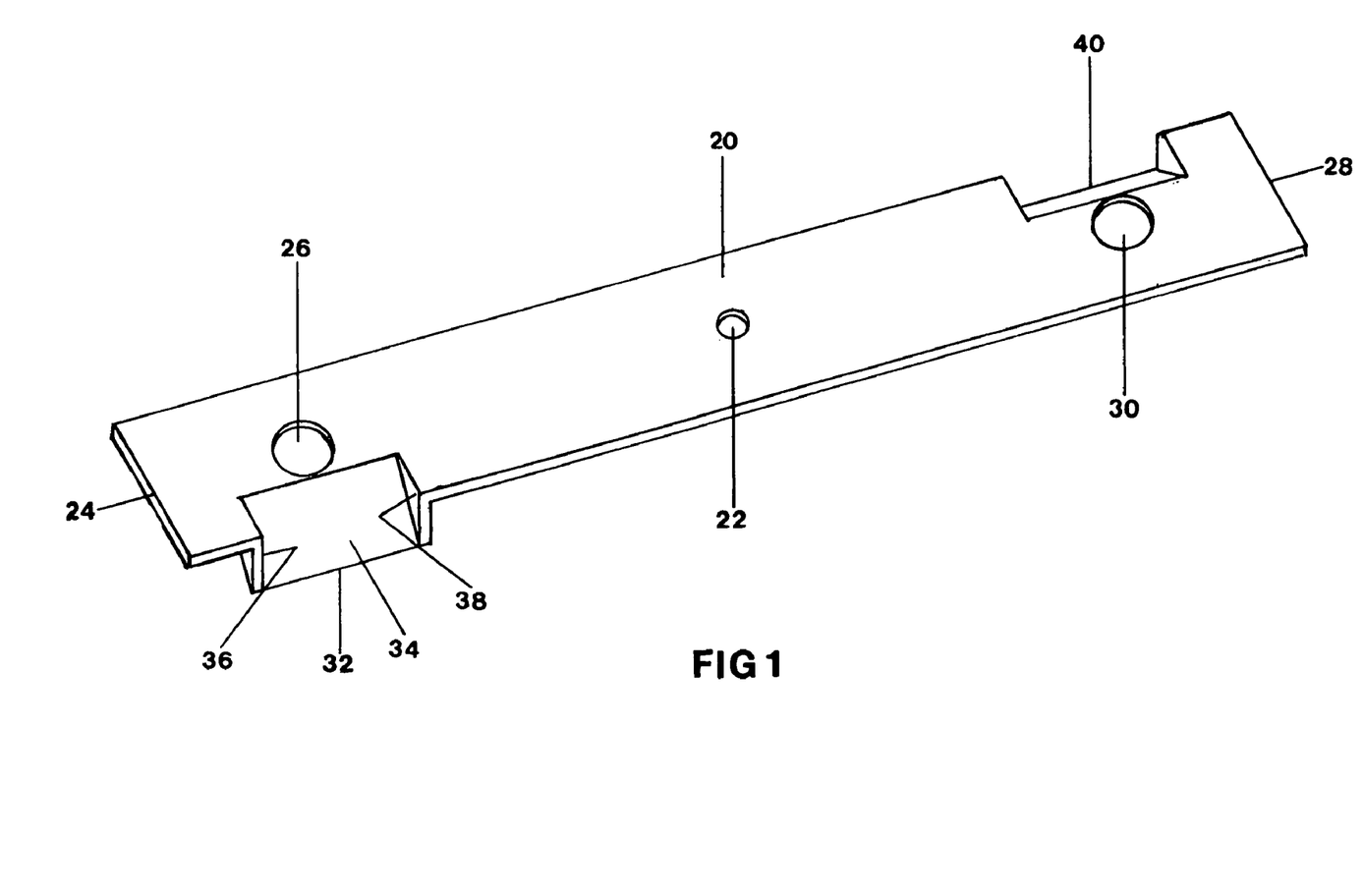
FIG. 1 is a prospective view of the body.
Figure 4:
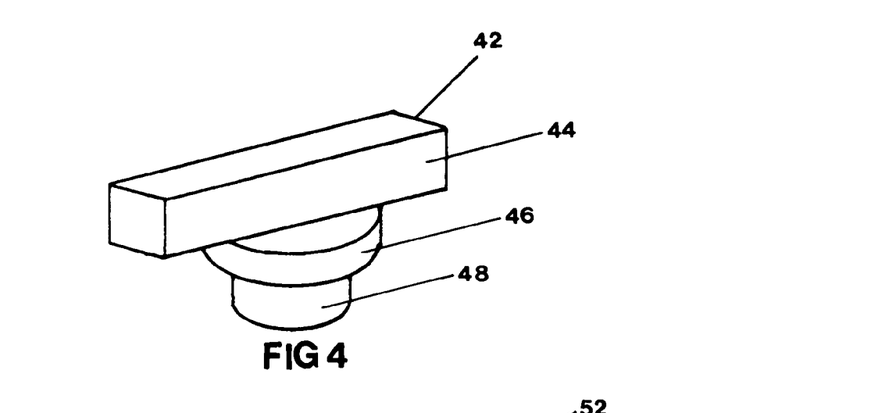
FIG. 4 shows a perspective view of pivot lock.

Referring to FIG. 1 what is shown is a right perspective view of a body 20 being of a rectangular shape and of sufficient length, width, and thickness. Centrally located in body 20 is center aperture 22 which is of sufficient diameter for mounting to a rotary lawnmower shaft. Located in body 20, in proximity of left outer end 24 is aperture 26 and in proximity of right outer end 28 is aperture 30. The diameters of aperture 26 and aperture 30 are of sufficient size as to accept locator boss 48 of pivot lock 42 as shown in FIG. 4. Aperture 26 and aperture 30 are centered longitudinally in body 20 in a predetermined equal distance from left outer end 24 and right outer end 28. Centered longitudinally on aperture 26 of body 20 is a right cavity 32. The width of right cavity 32 as shown in right cavity surface 34 is such as to accept the blade mounting end 52 of blade 50. As shown in FIG. 1 the right cavity 32 begins on the periphery of aperture 26 and extends laterally at a predetermined angle to the edge of body 20. This area is represented by right cavity surface 34 and bounded on each end by a left end surface 36 and a right end surface 38 which form right angles to right cavity surface 34. The left cavity 40 is an exact duplicate of right cavity 32, it being located diametrically on the longitudinal plane of body 20, being in the same relationship to aperture 30 as right cavity 32 is to aperture 26. Refer to above description for details.

Figures 2, 3:
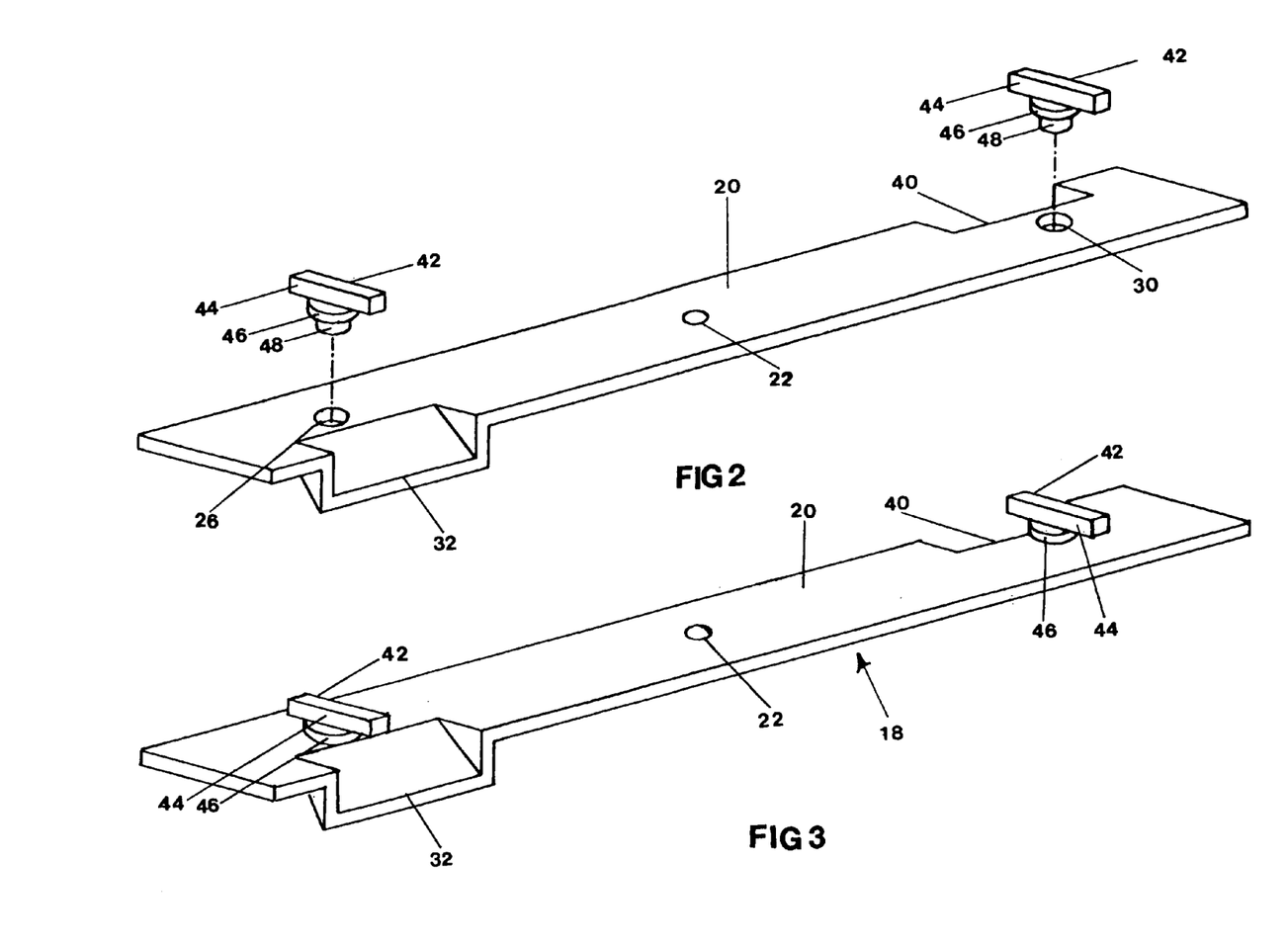
FIG. 2 shows an exploded prospective view of pivot lock and body.
FIG. 3 is a view of FIG. 2 showing pivot locks and body assembled.

In FIG. 2 we see body 20 in a right perspective view with projection lines emanating from aperture 26 and aperture 30 and showing proper assembly location of pivot locks 42 to body 20.

FIG. 3 is a right perspective view of body assembly 18, showing pivot locks 42 assembled in aperture 26 and aperture 30 (see FIG. 2). The correct assembly is accomplished by inserting locator boss 48 (see FIG. 2) in aperture 26 and aperture 30 (see FIG. 2). Locator boss 48 and aperture 26 and aperture 30 (see FIG. 2) being of a size that results in an interference fit. The pivot bosses 46 are in horizontal contact with body 20 and the horizontal axis of lock bars 44 are at a right angle to the longitudinal axis of body 20. The locator bosses 48 (see FIG. 2) are now industrially fastened (such as welding) to body 20.

FIG. 4 depicts the pivot lock 42 which is preferably fabricated from metal suitable to heat treating to obtain durability. The lock bar 44 is of an elongated rectangular shape of a predetermined size. The pivot boss 46 being an integral part of the lock bar 44 is centrally located on the lock bar's 44 longitudinal axis. The locator boss 48 is of a cylindrical shape with the diameter and thickness being of a predetermined size. Centrally connected to and being a part of the pivot boss 46 is the locator boss 48. The locator boss 48 is of a size as to create an interference fit in aperture 26 and aperture 30 of body 20 shown in FIG. 2.

Figure 5:
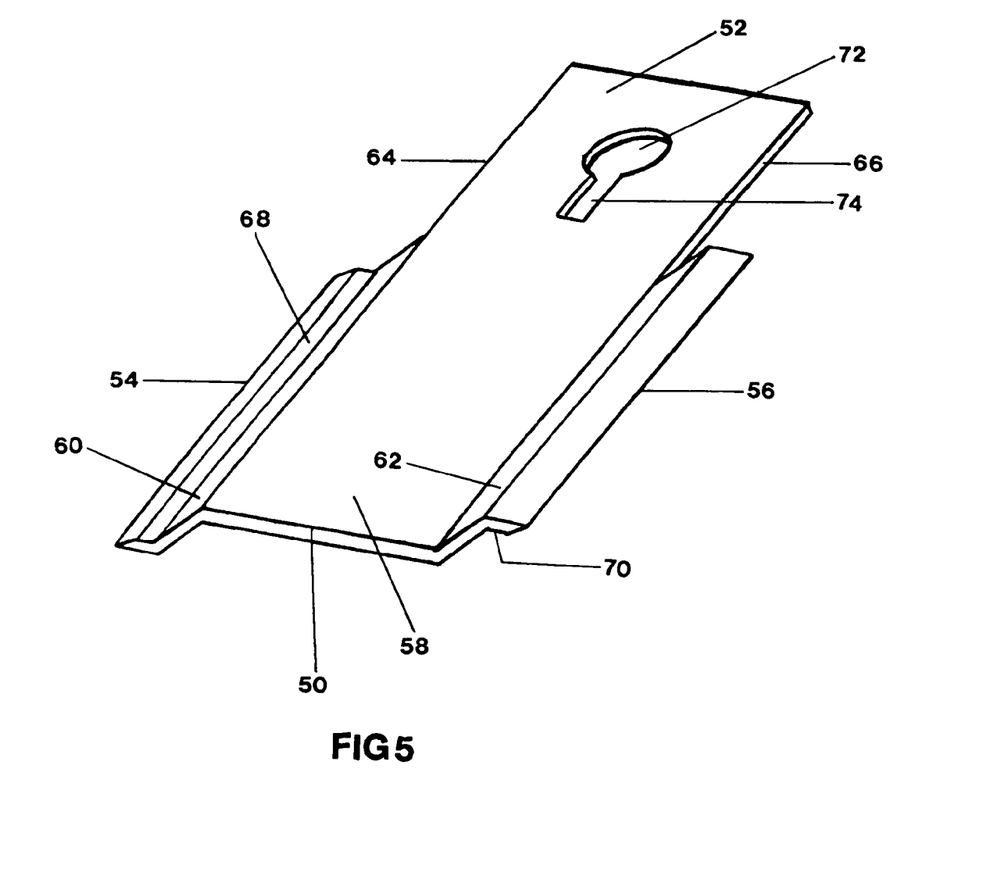
FIG. 5 is a perspective view of blade.

FIG. 5 is a perspective view of blade 50 which can be fabricated by accepted industrial methods from a variety of metals and plastics. The preferred material being steel suitable to heat treating or case hardening. The blade's 50 thickness is such that it falls within the parameters of industry accepted blade thicknesses. The length of blade 50 is made by calculations that take into consideration the body 20 (FIG. 1) length and industry standard lengths for mower blades. The blade mounting end 52 of the blade 50 is of the same width as the body 20 of FIG. 1. The length of the blade mounting end 52 is such as to allow left cutting edge 54 and right cutting edge 56 to clear the body 20 (FIG. 1) during assembly. A blade cutting end surface 58 is a longitudinal continuation of the blade mounting end 52.

The blade cutting end surface 58 contains a grass turbulence left surface 60 and the grass turbulence right surface 62. The grass turbulence left surface 60 is formed by bending blade 50 downward to a predetermined suitable angle along a line continuation of the left edge 64. A left cutting edge surface 68 is created by bending the blade 50 on a predetermined line running parallel with grass turbulence left surface 60, and causing left cutting edge surface 68 to be in lateral parallelism with the blade cutting end surface 58, the left cutting edge surface 68 being beveled to form left cutting edge 54. Referring to grass turbulence right surface 62 being created by bending blade 50 upward to a predetermined suitable angle along a line continuation of right edge 66. A right cutting edge surface 70 is created by bending the blade 50 on a predetermined line running parallel with grass turbulence right surface 62 and causing the right cutting edge surface 70 to be in lateral parallelism with the blade cutting end surface 58, the right cutting edge surface 70 being beveled to form right cutting edge 56.

Figure 8:
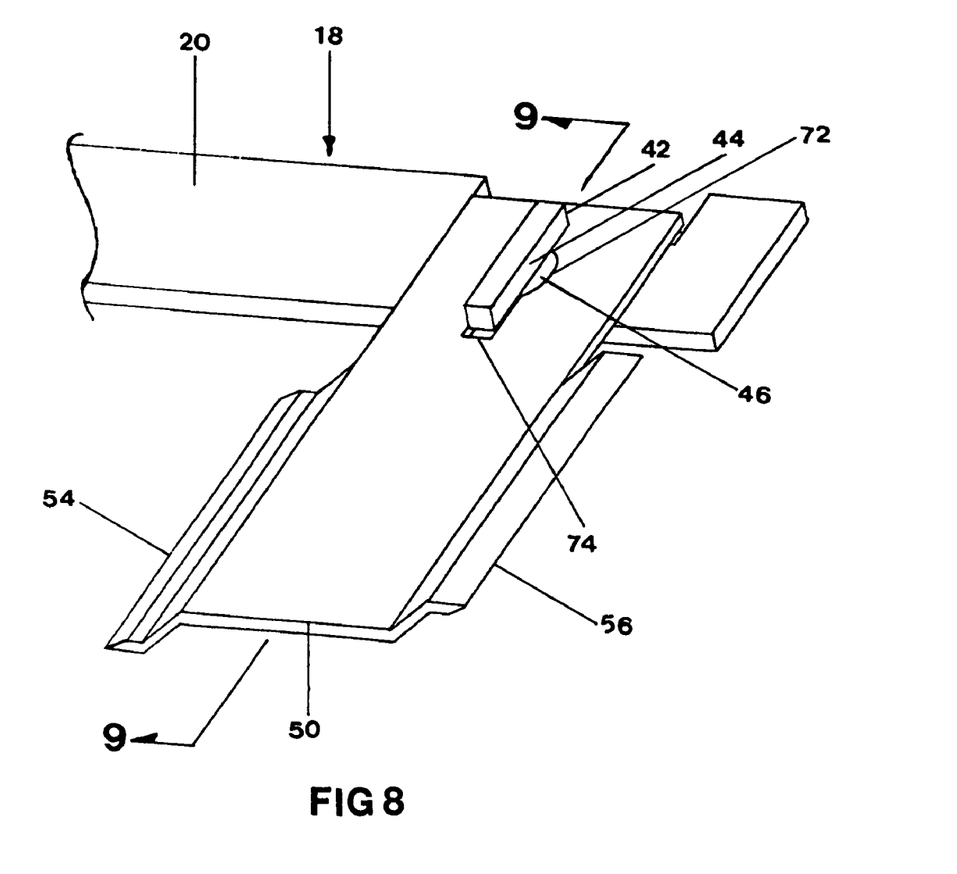
FIG. 8 is a perspective view of blade positioned on pivot lock in a 90° position to the longitudinal axis of the body.

A blade aperture 72 is located in the blade mounting end 52 of blade 50 in a central location between left edge 64 and right edge 66. Its longitudinal location is such that allows left cutting edge 54 and right cutting edge 56 to clear the body 20 during assembly as shown in FIG. 8. The blade aperture 72 diameter is of a size that when assembled on pivot boss 46 (FIG. 4) the blade 50 will freely pivot. A blade slot 74 being of a predetermined width and length and being on the longitudinal centerline and in connection with blade aperture 72 and oriented in the direction of the blade cutting end surface 58.

Figure 6:
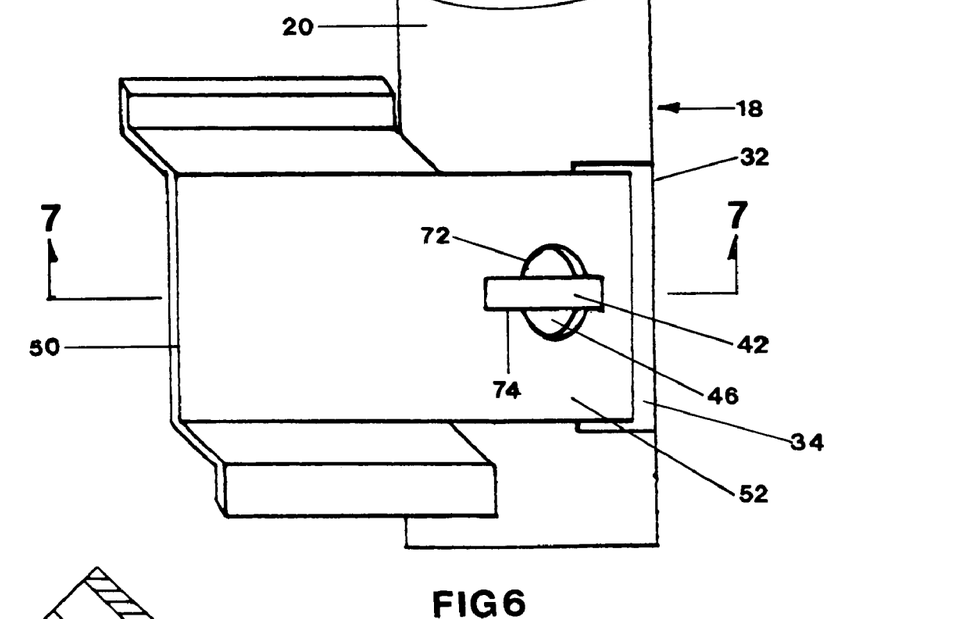
FIG. 6 is a top orthogonal view of blade placed over pivot lock.

FIG. 6 is a top orthogonal view of blade 50 and body assembly 18. The blade 50 is shown with blade aperture 72 positioned under pivot lock 42 and in contact with pivot boss 46. The blade mounting end 52 is centered in the right cavity 32 and is in physical contact with the right cavity surface 34. This results in the blade 50 being at a right angle to the body assembly 18 when viewed in the vertical plane (FIG. 6) and at an acute angle when viewed in the horizontal plane (FIG. 7).

Figure 7:
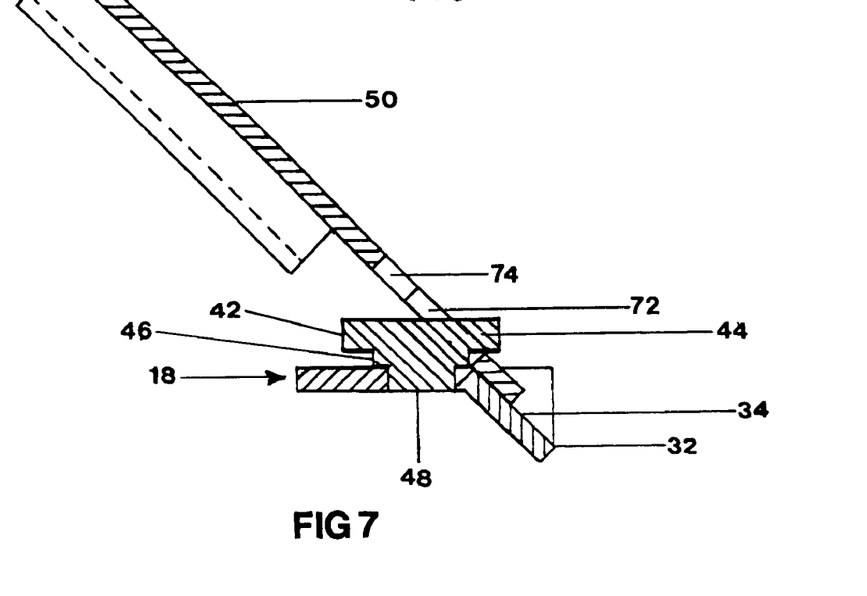
FIG. 7 is a sectional view of FIG. 6 taken along lines 6—6.

FIG. 7 is a sectional view taken at lines 7—7 of FIG. 6. This view shows FIG. 6 in greater detail.

FIG. 8 is a left top perspective view depicting the blade 50 with blade aperture 72 and blade slot 74 assembled over the pivot lock 42 and the pivot boss 46. The blade 50 is in parallelism with body assembly 18.

Figure 9:
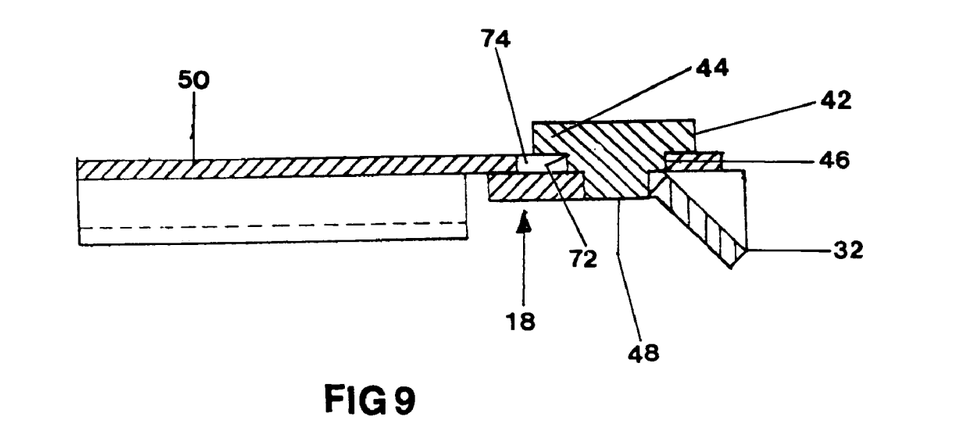
FIG. 9 is a sectional view of FIG. 8 taken along lines 8—8.

FIG. 9 is a sectional view along lines 9—9 of FIG. 8 showing blade 50 and body assembly 18 for clarity.

Figure 10:
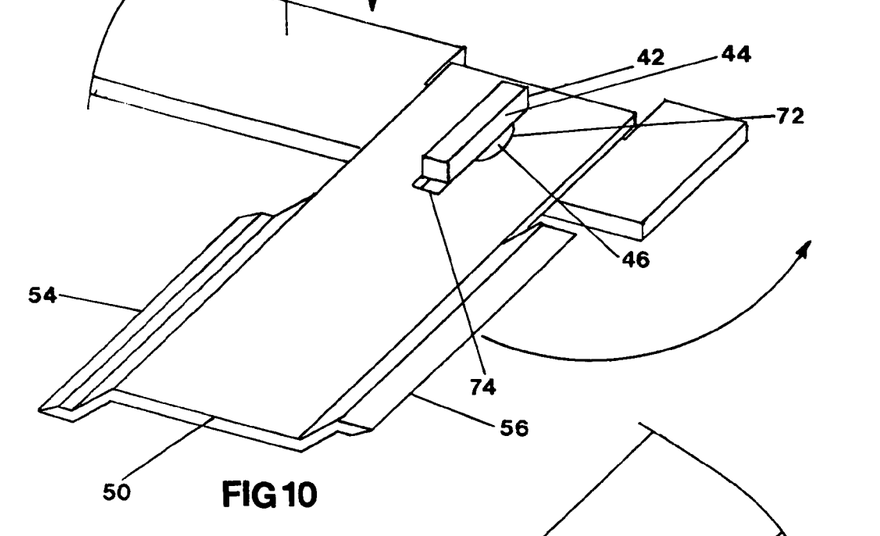
FIG. 10 is a perspective view of the blade positioned on the pivot lock in a 90° position to the longitudinal axis of the body with arrow indicating movement of the blade.

FIG. 10 is a left top perspective view and the same view as FIG. 8 with the addition of the arrow indicating the movement of blade 50.

Figure 11:
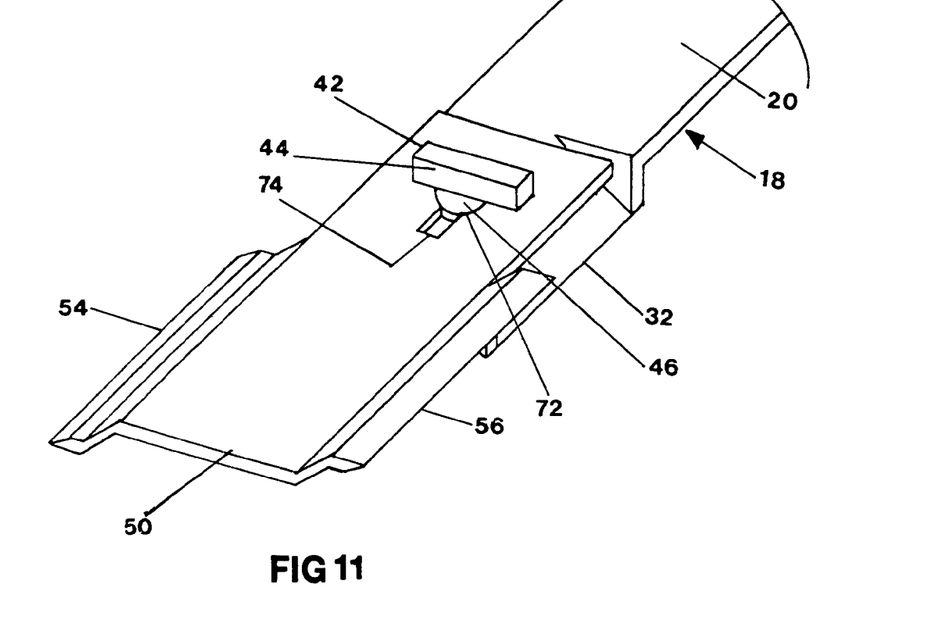
FIG. 11 is a perspective view showing the locked or operating position of the blade on the body.

FIG. 11 is a top perspective view depicting the blade 50 position resulting in the blade 50 movement indicated by the arrow in FIG. 10. The blade 50 is in its final or mowing position.

Figure 12:
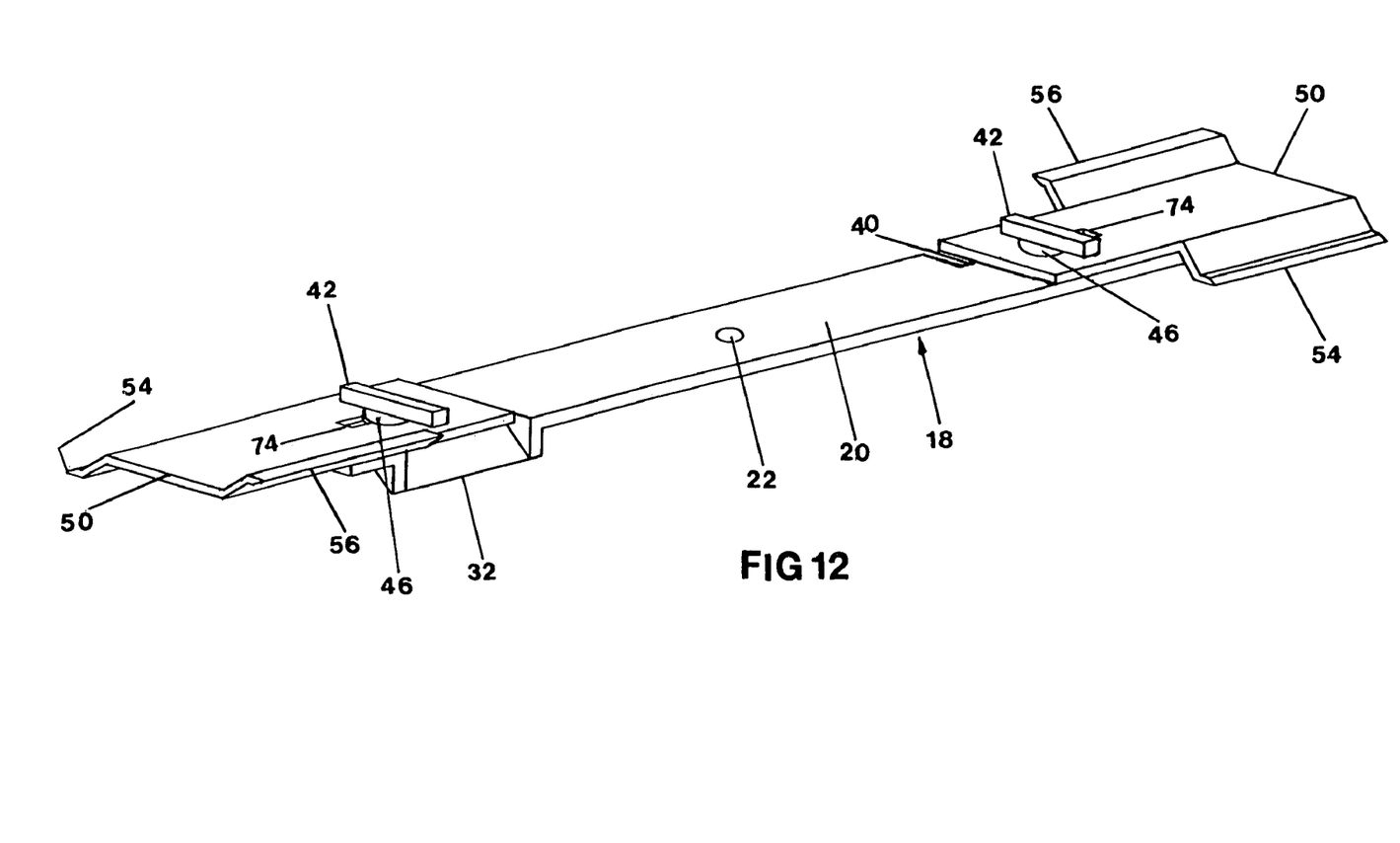
FIG. 12 is a perspective view of blade assembly.

FIG. 12 is a perspective view depicting the body assembly 18 with blades 50 assembled on both ends in the mowing position.

OPERATION OF PREFERRED EMBODIMENT

The preferred embodiment of FIG. 12 is of the parts being shown in assembly. The design of body assembly 18 causes the blades 50, which are of symmetrical design, to result in the cutting edges 54 being diametrically opposed. The body assembly 18 via center aperture 22 is bolted to a rotary powered lawnmower shaft that when viewed from the top rotates the body assembly 18 in a clockwise direction, causing cutting edges 54 to contact, cut and exit the grass from the mower.

The blades 50 (FIG. 5) are assembled to the body assembly 18 (FIG. 3) in the following manner. The blade aperture 72 and blade slot 74 (FIG. 5) are placed over pivot lock 42 and pivot boss 46 (FIGS. 4, 6) until blade mounting end 52 (FIG. 5) comes into contact with the right cavity surface 34 (FIG. 6). This results in the blade 50 being in an acute angle to the body assembly 18. The blade 50 is now slid parallel with the right cavity surface 34 until blade aperture 72 contacts pivot lock 42 (FIG. 7). The blade 50 can now be moved downward, causing blade aperture 72 and blade slot 74 to clear lock bar 44 and pivot boss 46, this being shown more clearly in FIGS. 8 and 9. The blade 50 is now in parallel contact with body assembly 18 (FIGS. 8, 9) and can now be rotated to its mowing position shown in FIG. 11. The blade 50 now being in its correct mowing position causes the blade slot 74 to be in a right angular position to the lock bar 44 and causing the blade 50 to be locked to the body assembly 18. To remove the blade 50 from the body assembly 18 the above reverse procedure is performed. The blade 50 (FIG. 5) is of a symmetrical design with a left cutting edge 54 and a right cutting edge 56 (FIG. 5). When the blade 50 (FIG. 5) is removed from the body assembly 18 (FIG. 11) and rotated 180° about its longitudinal axis and replaced on the body assembly 18 (FIG. 1) a new cutting edge 56 is in proper placement for cutting grass. The foregoing procedure is used to replace, remove, and reverse blades 50.

Thus the reader will see that the blade assembly is easily attachable to the lawnmower, simple to change the detachable and reusable blades, economical to manufacture, and can be used by persons regardless of their mechanical ability.

While my above description contains many specifications, these should not be construed as limitations on the scope of the invention, but rather as an exemplification of one of the preferred embodiments thereof. Other variations are possible. For example:

Changing of the physical dimensions

Using different materials

Accordingly, the scope of the invention should be determined not by the embodiments illustrated, but the appended claims and their legal equivalents.

What is claimed is:

1. A rotary lawnmower blade assembly comprising:

a) a rectangular body having a centrally located aperture of a size for mechanical attachment to a lawnmower power shaft, the body being of a predetermined thickness;

b) a pivot lock having a lock bar, a pivot boss and a locator boss;

c) the body having at each end an end aperture at a predetermined position and sized for accepting the locator boss;

d) the locator boss being slidably assembled into the end aperture and fastened to the body;

e) the body having at each end a cavity of a predetermined size and at a location adjacent to the pivot locks, the cavities being on opposite sides of the longitudinal axis of the body;

f) a blade being symmetrical when rotated around its longitudinal axis;

g) the blade having cutting edges parallel with the blade's longitudinal axis;

h) the blade having a blade-mounting end comprising a blade aperture and a slot, the slot being radially connected to the blade aperture; and i) the blade having a grass turbulence left surface and a grass turbulence right surface causing a rotational air disturbance resulting in cut grass exiting the lawnmower during rotation of the blade;

wherein the lawnmower blade assembly is assembled by aligning the blade aperture and the slot over the lock bar with the blade-mounting end of the blade in the cavity; then sliding the blade over the lock bar until the blade aperture engages the pivot boss, then the lockbar is slid through the slot until the blade is parallel with the body; then the blade is moved laterally until the blade aperture is in slidable contact with the pivot boss; then the blade is pivotally rotated until the slot is perpendicular to the lock bar so that the blade is in a locked position.

2. A rotary lawnmower blade assembly according to claim 1, wherein the body includes a second identical blade positioned on the opposite end of the body.

\* \* \* \* \*